(12) United States Patent
Miki et al.

(10) Patent No.: US 8,428,019 B2
(45) Date of Patent: Apr. 23, 2013

(54) BASE STATION

(75) Inventors: Nobuhiko Miki, Yokohama (JP);
Yoshihisa Kishiyama, Yokosuka (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 356 days.

(21) Appl. No.: 12/672,584

(22) PCT Filed: Aug. 13, 2008

(86) PCT No.: PCT/JP2008/064540
§ 371 (c)(1),
(2), (4) Date: May 6, 2010

(87) PCT Pub. No.: WO2009/022706
PCT Pub. Date: Feb. 19, 2009

(65) Prior Publication Data
US 2011/0026471 A1    Feb. 3, 2011

(30) Foreign Application Priority Data
Aug. 14, 2007   (JP) .................................. 2007-211598

(51) Int. Cl.
*H04W 4/00* (2009.01)

(52) U.S. Cl.
USPC ............ 370/329; 370/328; 370/330; 370/338

(58) Field of Classification Search .................... None
See application file for complete search history.

(56) References Cited

U.S. PATENT DOCUMENTS

| | | | |
|---|---|---|---|
| 2006/0039318 A1* | 2/2006 | Oh et al. | 370/328 |
| 2007/0047474 A1* | 3/2007 | Anderson | 370/277 |
| 2008/0013599 A1* | 1/2008 | Malladi | 375/132 |
| 2009/0301437 A1 | 12/2009 | Mizoguchi et al. | |

FOREIGN PATENT DOCUMENTS

| | | |
|---|---|---|
| EP | 1628498 | 2/2006 |
| JP | 11-243382 | 9/1999 |
| JP | 2006-60814 | 3/2006 |
| JP | 2007-211598 A | 8/2007 |

OTHER PUBLICATIONS

International Search Report w/translation from PCT/JP2008/064540 dated Sep. 22, 2008 (3 pages).
Written Opinion from PCT/JP2008/064540 dated Sep. 22, 2008 (3 pages).

(Continued)

*Primary Examiner* — Faruk Hamza
*Assistant Examiner* — Diane Lo
(74) *Attorney, Agent, or Firm* — Osha Liang LLP

(57) ABSTRACT

A base station communicates with a user device transmitting an uplink signal based on a single-carrier transmission scheme. The base station includes a frequency hopping determining unit configured to determine whether to apply frequency hopping to the user device based on radio-wave propagation information from the user device and a traffic type of data to be transmitted by the user device; a scheduler configured to allocate frequencies to the user device based on uplink channel reception conditions of the user device; and a reporting unit configured to report allocation information indicating resource units allocated by the scheduler to the user device. When the frequency hopping determining unit determines to apply the frequency hopping to the user device, the scheduler allocates, to the user device, resource units with different frequency bands in different slots.

5 Claims, 12 Drawing Sheets

OTHER PUBLICATIONS

3GPP TR 25.814 V7.0.0; "Physical layer aspects for evolved Universal Terrestrial Radio Access (UTRA)"; Jun. 2006 (126 pages).

Mexican Office Action for Application No. MX/a/2010/001642, mailed on Sep. 23, 2011 (4 pages).

Office Action for Japanese Patent Application No. 2011-090459 mailed Nov. 27, 2012, with English translation thereof (2 pages).

Espacenet, Patent Abstract for Japanese Publication No. 2007211598 published Aug. 23, 2007 (2 pages).

* cited by examiner

FIG.13
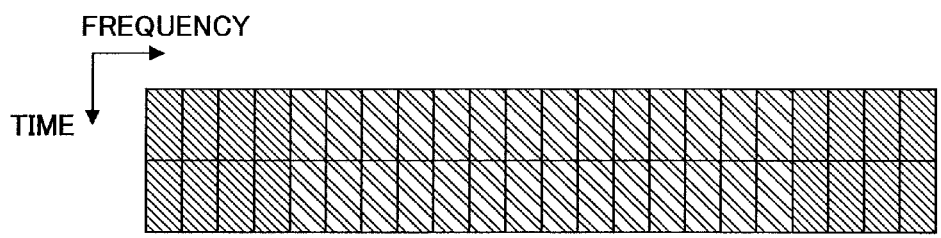
| | RESOURCE UNITS ALLOCATED TO USER DEVICES TO WHICH FREQUENCY HOPPING IS APPLIED |
| | RESOURCE UNITS ALLOCATED TO USER DEVICES TO WHICH LOCALIZED FDMA IS APPLIED |
FIG.14
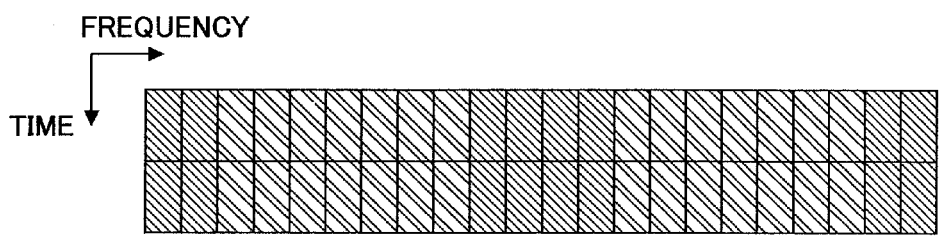
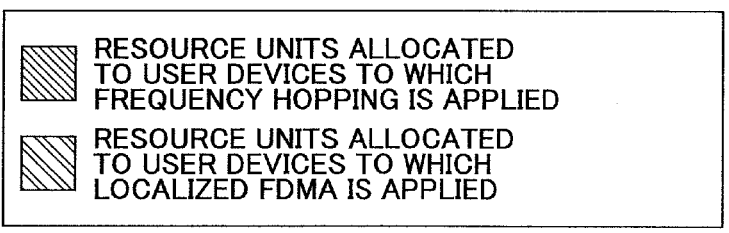

BASE STATION

TECHNICAL FIELD

The present invention generally relates to a radio communication system. More particularly, the present invention relates to a base station.

BACKGROUND ART

A successor communication system to W-CDMA and HSDPA, i.e., Long Term Evolution (LTE), is currently being discussed by 3GPP, a standardization group for W-CDMA. In LTE, orthogonal frequency division multiplexing (OFDM) is to be used as a downlink radio access method and single-carrier frequency division multiple access (SC-FDMA) is to be used as an uplink radio access method (see, for example, 3GPP TR 25.814 (V7.0.0), "Physical Layer Aspects for Evolved UTRA," June 2006).

In OFDM, a frequency band is divided into multiple narrow frequency bands (subcarriers) and data are transmitted on the subcarriers. The subcarriers are densely arranged along the frequency axis such that they partly overlap each other but do not interfere with each other. This method enables high-speed transmission and improves frequency efficiency.

In SC-FDMA, a frequency band is divided into multiple frequency bands and the frequency bands are allocated to different terminals for transmission in order to reduce interference between the terminals. Also, SC-FDMA reduces variation of the transmission power and therefore makes it possible to reduce power consumption of terminals and to achieve wide coverage.

A reference signal for uplink in E-UTRA indicates a pilot channel that is used for purposes such as synchronization, channel estimation for coherent detection, and measurement of received SINR in transmission power control. The reference signal is a transmission signal known to the receiving end, i.e., the base station and is embedded at certain intervals in subframes.

SC-FDMA used as an uplink radio access method in E-UTRA is described below with reference to FIG. 1. In SC-FDMA, a system frequency band is divided into multiple resource blocks each including one or more subcarriers. Each user device (user equipment: UE) is allocated one or more resource blocks. In frequency scheduling, to improve the transmission efficiency or the throughput of the entire system, resource blocks are allocated preferentially to user devices with good channel conditions according to received signal quality or channel quality indicators (CQIs) measured and reported based on downlink pilot channels for the respective resource blocks by the user devices. Also for uplink radio access in E-UTRA, use of frequency hopping, where allocation of frequency blocks is varied according to a frequency hopping pattern, is being discussed.

In FIG. 1, time and frequency resources allocated to different user devices are represented by different hatchings. For example, a relatively wide frequency band is allocated to UE2 in the first subframe, but a relatively narrow frequency band is allocated to UE2 in the next subframe. Different frequency bands are allocated to the user devices without overlapping.

In SC-FDMA, different time and frequency resources are allocated to user devices in a cell for transmission to achieve orthogonality between the user devices in the cell. Here, the minimum unit of the time and frequency resources is called a resource unit (RU). In SC-FDMA, a consecutive frequency band is allocated to each user to achieve single-carrier transmission with a low peak-to-average power ratio (PAPR). Allocation of the time and frequency resources in SC-FDMA is determined by a scheduler of a base station based on propagation conditions of user devices and the quality of service (QoS) of data to be transmitted. The QoS includes a data rate, a desired error rate, and a delay. Thus, in SC-FDMA, the system throughput is improved by allocating time and frequency resources providing good propagation conditions to respective user devices.

Base stations in a system independently determine allocation of time and frequency resources. Therefore, a frequency band allocated in a cell may overlap a frequency band allocated in a neighboring cell. If frequency bands allocated in neighboring cells partly overlap each other, signals interfere with each other and their quality is reduced.

DISCLOSURE OF INVENTION

Problems to be Solved by the Invention

As described above, use of frequency hopping for uplink radio access in E-UTRA is being discussed.

However, configurations or methods for signaling a frequency hopping pattern and/or allocated resource units in frequency hopping have not been discussed yet.

One object of the present invention is to provide a base station that makes it possible to use frequency hopping for uplink radio access in an E-UTRA system.

Means for Solving the Problems

In an aspect of this disclosure, there is provided a base station communicating with a user device transmitting an uplink signal based on a single-carrier transmission scheme. The base station includes a frequency hopping determining unit configured to determine whether to apply frequency hopping to the user device based on radio-wave propagation information from the user device and a traffic type of data to be transmitted by the user device; a scheduler configured to allocate frequencies to the user device based on uplink channel reception conditions of the user device; and a reporting unit configured to report allocation information indicating resource units allocated by the scheduler to the user device. When the frequency hopping determining unit determines to apply the frequency hopping to the user device, the scheduler is configured to allocate, to the user device, resource units with different frequency bands in different slots.

Advantageous Effect of the Invention

One aspect of the present invention provides a base station that makes it possible to use frequency hopping for uplink radio access in an E-UTRA system.

BRIEF DESCRIPTION OF THE DRAWINGS

FIG. 13 is a drawing illustrating exemplary allocation of resource units to user devices to which frequency hopping is applied; and FIG. 14 is a drawing illustrating exemplary allocation of resource units to user devices to which frequency hopping is applied.

Figure 1:
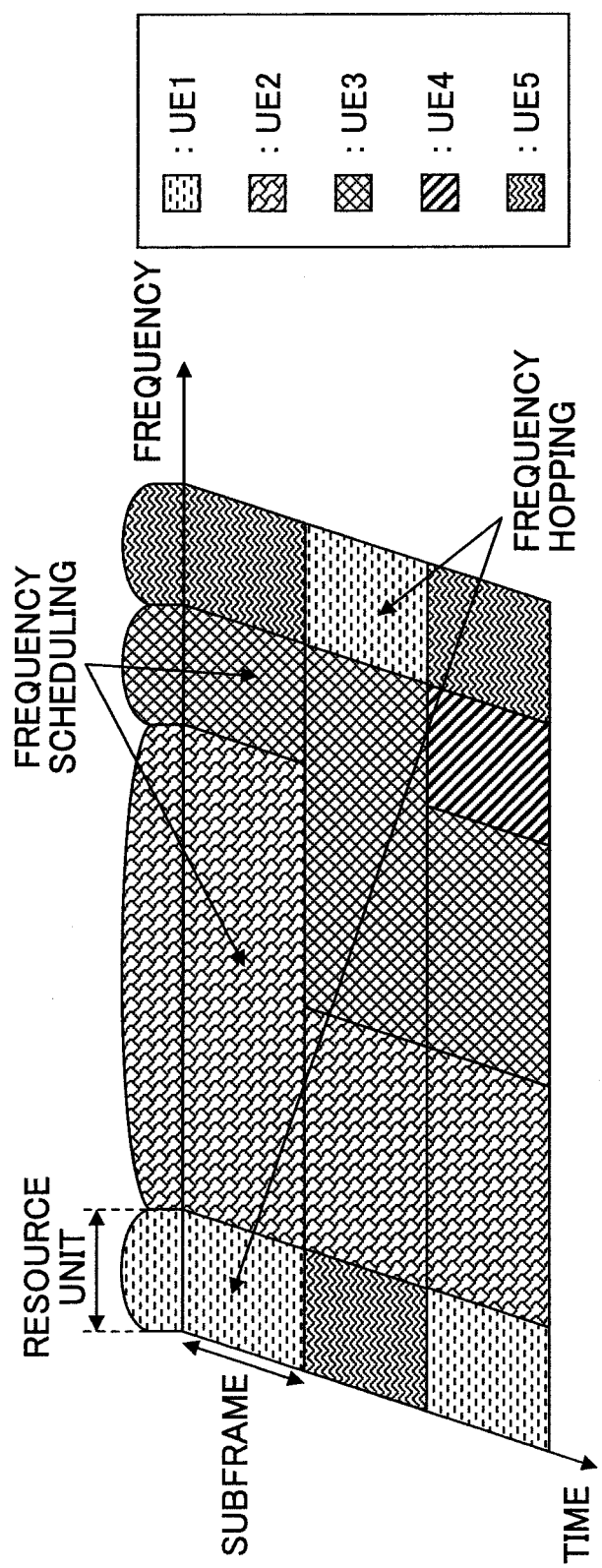
FIG. 1 is a drawing illustrating single-carrier FDMA.

EXPLANATION OF REFERENCES $50_k$ ($50_1$, $50_2$, ..., $50_k$) Cell
$100_n$ ($100_1$, $100_2$, $100_3$, ..., $100_n$) User device
102 OFDM signal demodulation unit
104 Uplink-scheduling-grant-signal demodulation/decoding unit
106 Other-control-and-data-signals demodulation/decoding unit
108 Demodulation RS generating unit
110 Channel coding unit
112 Data modulation unit
114 SC-FDMA modulation unit
116 Broadcast-channel demodulation/decoding unit
$200_m$ ($200_1$, $200_2$, $200_3$, ..., $200_m$) Base station
202 OFDM signal generating unit
204 Uplink-scheduling-grant-signal-transmission-control-signal generating unit
206 Demodulation RS generating unit
208 Synchronization-detection/channel-estimation unit
210 Channel decoding unit
212 Coherent detection unit
214 Uplink-channel-condition estimation unit
216 Scheduler
218 Frequency hopping determining unit
220 Broadcast channel generating unit
400 Core network
500 Physical uplink shared channel
510 Uplink control channel
520 Uplink control channel

BEST MODE FOR CARRYING OUT THE INVENTION

Embodiments of the present invention are described below with reference to the accompanying drawings. Throughout the accompanying drawings, the same reference numbers are used for parts having the same functions, and overlapping descriptions of those parts are omitted.

Figure 2:
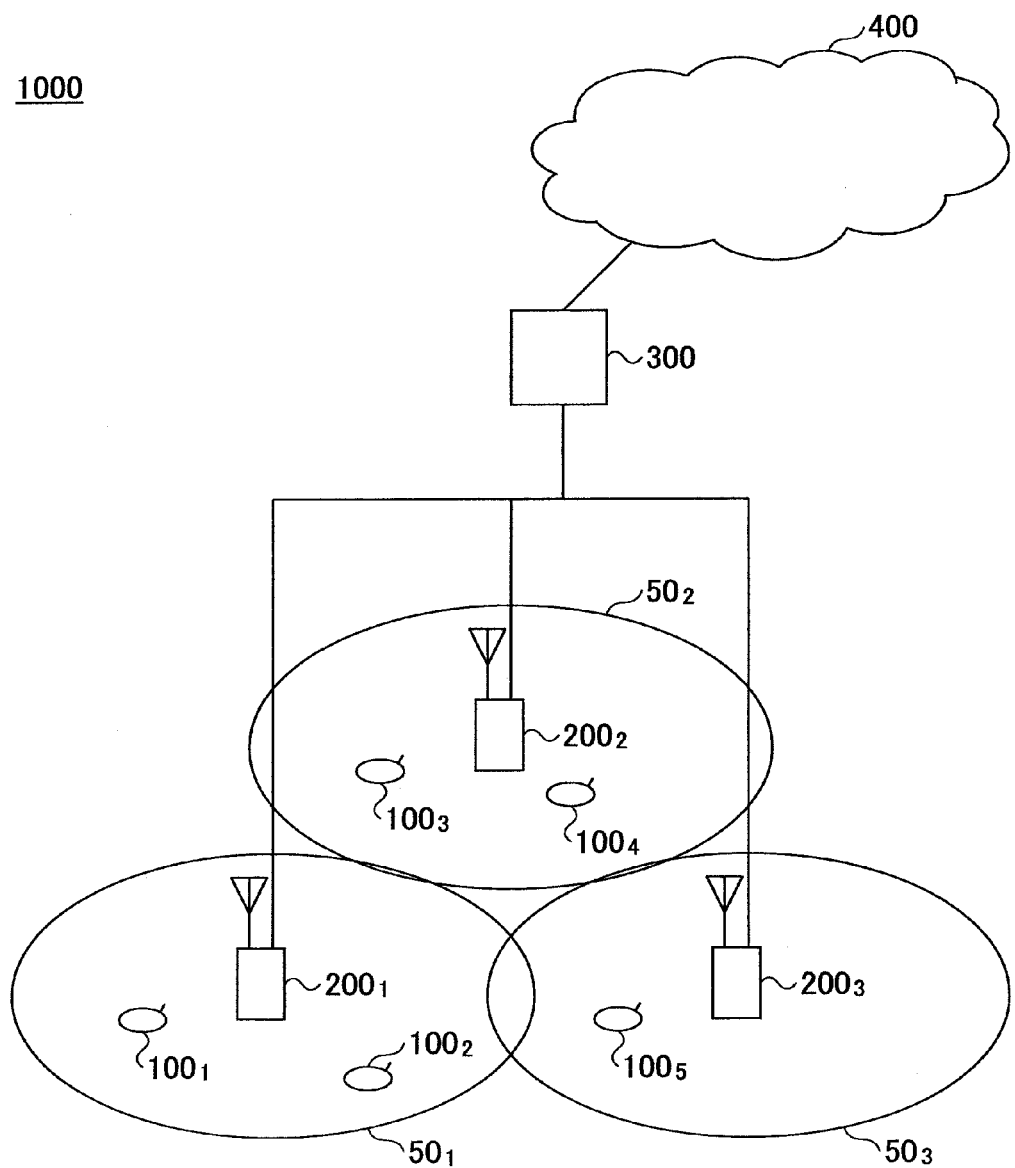
FIG. 2 is a drawing illustrating a radio communication system according to an embodiment of the present invention.

A radio communication system 1000 including user devices and base stations according to an embodiment of the present invention is described below with reference to FIG. 2. In the present application, user devices (user equipment: UE) may also be called mobile stations.

The radio communication system 1000 is based on, for example, Evolved UTRA and UTRAN (also called Long Term Evolution or Super 3G). The radio communication system 1000 includes base stations (eNode B: eNB) $200_m$ ($200_1$, $200_2$, $200_3$, ..., $200_m$; m is an integer greater than 0) and user devices $100_n$ ($100_1$, $100_2$, $100_3$, ..., $100_n$; n is an integer greater than 0) that communicate with the base stations $200_m$. The base stations $200_m$ are connected to an upper node such as an access gateway 300 and the access gateway 300 is connected to a core network 400. Each of the user devices $100_n$ is in one of cells $50_k$ ($50_1$, $50_2$, ..., $50_k$; k is an integer greater than 0) and communicates with the corresponding one of the base stations $200_m$ according to Evolved UTRA and UTRAN.

Here, it is assumed that some of the user devices $100_n$ have already established communication channels with the base stations $200_m$ and are in communications; and the other user devices $100_n$ have not established communication channels with the base stations $200_m$ and are not in communications.

Each of the base stations $200_m$ transmits synchronization signals. Each of the user devices $100_n$ is located in one of the cells $50_k$ ($50_1$, $50_2$, ..., $50_k$; k is an integer greater than 0). When the user device $100_n$ is, for example, turned on or in the intermittent reception mode during communications, the user device $100_n$ performs a cell search based on the synchronization signals to find a cell that provides good radio communication quality for the user device $100_n$. More specifically, the user device $100_n$ detects a symbol timing and a frame timing and detects cell-specific control information such as a cell ID (or a scrambling code unique to a cell generated from the cell ID) or a group of cell IDs (hereafter called a cell ID group) based on the synchronization signals.

A cell search may be performed when the user device $100_n$ is in communications as well as when the user device $100_n$ is not in communications. For example, the user device $100_n$ performs a cell search during communications to find a cell using the same frequency or to find a cell using a different frequency. The user device $100_n$ also performs a cell search when it is not in communications, for example, when the user device $100_n$ has just been turned on or is in the standby mode.

The base stations $200_m$ ($200_1$, $200_2$, $200_3$, ..., $200_m$) have the same configuration and functions and are therefore called the base station 200, the base station $200_m$, or the base stations $200_m$ in the descriptions below unless otherwise mentioned. The user devices $100_n$ ($100_1$, $100_2$, $100_3$ ... $100_n$) have the same configuration and functions and are therefore called the user device 100, the user device $100_n$, or the user devices $100_n$ in the descriptions below unless otherwise mentioned. The cells $50_k$ ($50_1$, $50_2$, $50_3$, ..., $50_k$) have the same configuration and functions and are therefore called the cell $50_k$ or the cells $50_k$ in the descriptions below unless otherwise mentioned.

In the radio communication system 1000, orthogonal frequency division multiplexing (OFDM) is used as the downlink radio access method and single-carrier frequency division multiple access (SC-FDMA) is used as the uplink radio access method. In OFDM, as described above, a frequency band is divided into narrow frequency bands (subcarriers) and data are transmitted on the subcarriers. In SC-FDMA, a frequency band is divided into multiple frequency bands and the frequency bands are allocated to different user devices for transmission in order to reduce interference between the user devices.

Communication channels used in Evolved UTRA and UTRAN are described below.

For downlink, a physical downlink shared channel (PDSCH) shared by the user devices $100_n$ and an LTE downlink control channel are used. In downlink, the LTE downlink control channel is used to report information on user devices to be mapped to the physical downlink shared channel, transport format information for the physical downlink shared channel, information on user devices to be mapped to a physical uplink shared channel, transport format information for the physical uplink shared channel, and acknowledgement information for the physical uplink shared channel; and the physical downlink shared channel is used to transmit user data.

Also in downlink, the base stations $200_m$ transmit synchronization signals used by the user devices $100_n$ to perform cell searches.

For uplink, a physical uplink shared channel (PUSCH) shared by the user devices $100_n$ and an LTE uplink control channel are used. There are two types of uplink control channels: the first is an uplink control channel to be time-division-multiplexed with the physical uplink shared channel, and the second is an uplink control channel to be frequency-division-multiplexed with the physical uplink shared channel. In uplink, the LTE uplink control channel is used to report downlink channel quality indicators (CQI) used for scheduling and adaptive modulation and coding (AMC) of the physical downlink shared channel and to report acknowledgement information (HARQ ACK information) for the physical downlink shared channel.

Figure 3:
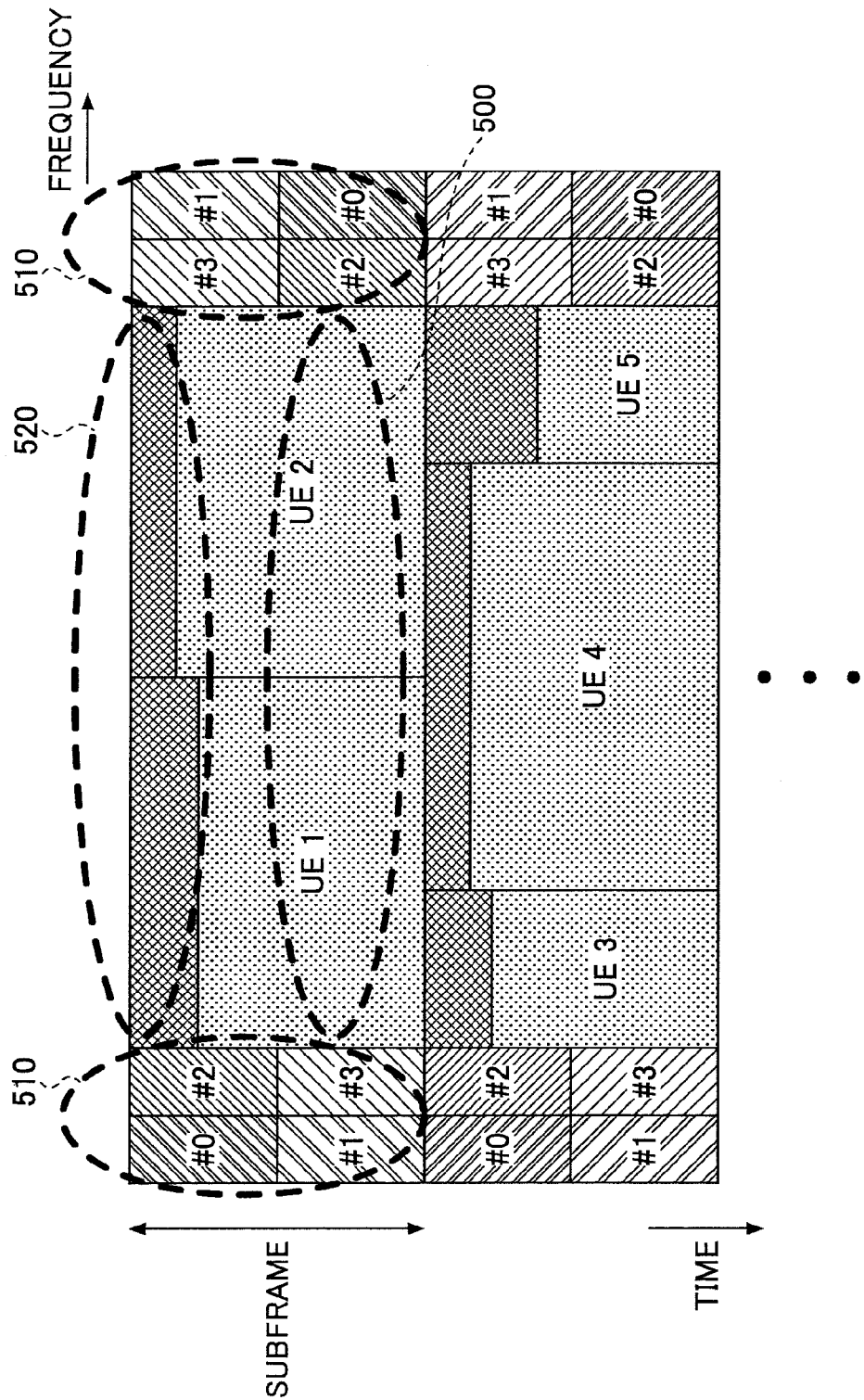
FIG. 3 is a drawing illustrating exemplary mapping of uplink control channels.

An "uplink channel" may indicate either the physical uplink shared channel or the LTE uplink control channel. There are two types of LTE uplink control channels: the first is an uplink control channel to be time-division-multiplexed with the physical uplink shared channel, and the second is an uplink control channel to be frequency-division-multiplexed with the physical uplink shared channel. FIG. 3 is a drawing illustrating exemplary mapping of LTE uplink control channels.

As shown in FIG. 3, frequency-division-multiplexed uplink control channels are mapped to different positions in two slots of a subframe (frequency hopping is applied to the uplink control channels). In FIG. 3, 500 indicates a physical uplink shared channel, 510 indicates uplink control channels that are frequency-division-multiplexed with the physical uplink shared channel, and 520 indicates uplink control channels that are time-division-multiplexed with the physical uplink shared channel.

In uplink, the LTE uplink control channel is used to report downlink channel quality indicators (CQI) used for scheduling and adaptive modulation and coding (AMC) of the physical downlink shared channel and to transmit acknowledgement information (HARQ ACK information) for the physical downlink shared channel; and the physical uplink shared channel is used to transmit user data.

A transport channel to be mapped to the physical uplink shared channel is an uplink shared channel (UL-SCH). User data are mapped to the UL-SCH.

The physical uplink control channel may also be used to transmit, in addition to the CQI and the acknowledgement information, a scheduling request for requesting allocation of resources of an uplink shared channel and a release request used in persistent scheduling. Here, allocation of resources of an uplink shared channel indicates a process where a base station reports to a user device by using the physical downlink control channel in a given subframe that the user device is allowed to communicate using the uplink shared channel in a subsequent subframe.

In the radio communication system of this embodiment, frequency hopping is used for uplink. In frequency hopping, allocation of frequency blocks is varied according to a frequency hopping pattern.

Figure 4:
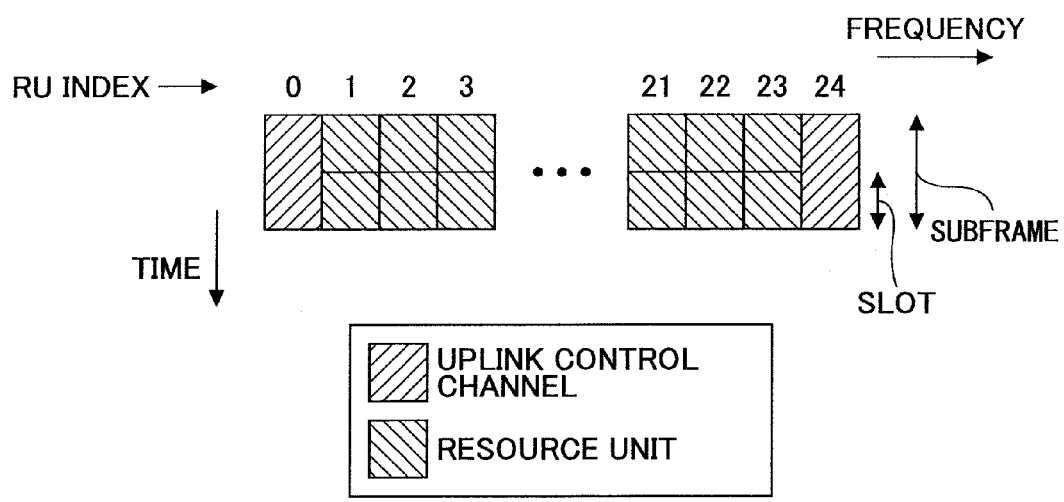
FIG. 4 is a drawing illustrating exemplary allocation of resource units to user devices to which frequency hopping is applied.

As shown in FIG. 4, when frequency hopping is used for uplink, resources are allocated to the user device $100_n$ by resource units (RU). In FIG. 4, the horizontal axis indicates frequency and the vertical axis indicates time. For example, one resource unit has a bandwidth of 180 kHz and one slot has a length of 0.5 ms. One subframe includes two slots.

Frequency bands located near the lower and higher ends of a system frequency band may be allocated to user devices to which frequency hopping is applied. This makes it possible to increase the frequency diversity among user devices to which frequency hopping is applied. Frequency bands other than the frequency bands near the lower and higher ends of the system frequency band are allocated to user devices to which localized FDMA is applied. For the user devices to which localized FDMA is applied, this improves the compatibility with the single-carrier transmission scheme.

The base station $200_m$ of this embodiment determines whether to apply frequency hopping to a user device based on propagation information and a traffic type of the user device. The propagation information of a user device includes the moving speed of the user device. For example, the base station $200_m$ determines to apply frequency hopping to a user device if it is expected that applying frequency hopping to the user device achieves frequency diversity gain. More specifically, the base station $200_m$ determines to apply frequency hopping to a user device moving at high speed or a user device periodically transmitting small-sized data such as voice packets (VoIP packets). After determining to apply frequency hopping to a user device, the base station $200_m$ reports to the user device that an uplink signal is transmitted to the user device by frequency hopping.

In scheduling, to the user device to which frequency hopping is to be applied, the base station $200_m$ allocates resource units with different frequency bands in different slots of each subframe. In other words, a subframe is divided in the time direction into a first half (first slot) and a second half (second slot), and a first resource unit(s) allocated in the first half (first slot) of the subframe has a frequency band that is different from the frequency band of a second resource unit(s) allocated in the second half (second slot) of the subframe.

After scheduling, the base station $200_m$ reports information indicating the allocated resource units via an uplink scheduling grant to the user device. For example, the base station $200_m$ reports, for each subframe, a first resource unit(s) and the amount of shift in the frequency direction from the first resource unit(s).

Next, the base station $200_m$ of this embodiment is described with reference to FIG. 5.

The base station $200_m$ of this embodiment includes an OFDM signal generating unit 202, an uplink-scheduling-grant-signal-transmission-control-signal generating unit 204, a demodulation RS generating unit 214, a synchronization-detection/channel-estimation unit 208, a channel decoding unit 210, a coherent detection unit 212, an uplink-channel-condition estimation unit 214, a scheduler 216, and a frequency hopping determining unit 218. The OFDM signal generating unit 202 and the uplink-scheduling-grant-signal-transmission-control-signal generating unit 204 constitute a transmitting unit. The demodulation RS generating unit 214, the synchronization-detection/channel-estimation unit 208, the channel decoding unit 210, the coherent detection unit 212, the uplink-channel-condition estimation unit 214, the scheduler 216, and the frequency hopping determining unit 218 constitute a receiving unit.

Uplink channels received from the user devices $100_n$ are input to the synchronization-detection/channel-estimation unit 208, the coherent detection unit 212, and the uplink-channel-condition estimation unit 214.

The synchronization-detection/channel-estimation unit 208 performs synchronization detection for the input received signals to estimate their reception timings, performs channel estimation based on a demodulation reference signal input from the demodulation RS generating unit 206 described later, and inputs the channel estimation results to the coherent detection unit 212.

The coherent detection unit 212 performs coherent detection for the received signals based on the channel estimation results and allocated frequencies and bandwidths input from the scheduler 216 described later, and inputs the demodulated received signals to the channel decoding unit 210. The channel decoding unit 210 decodes the demodulated received signals and generates reproduced data signals corresponding to user numbers of selected user devices $100_n$ input from the scheduler 216. The generated reproduced data signals are transmitted to a network.

The uplink-channel-condition estimation unit 214 estimates uplink channel conditions of the user devices $100_n$ based on the input received signals and inputs the estimated uplink channel conditions to the scheduler 216.

The frequency hopping determining unit 218 receives propagation information and traffic types of the user devices $100_n$. Based on the received propagation information and traffic types of the user devices $100_n$, the frequency hopping determining unit 218 determines whether to apply frequency hopping to the user devices 100. For example, if the propagation information of a user device indicates that the moving speed of the user device is greater than or equal to a predetermined threshold or if the traffic type is small-sized data such as voice packets (VoIP packets) that are transmitted periodically, the frequency hopping determining unit 218 determines to apply frequency hopping to the user device. Meanwhile, if the propagation information of a user device indicates that the moving speed of the user device is less than the predetermined threshold or if the traffic type is other than small-sized data such as voice packets (VoIP packets) that are transmitted periodically, the frequency hopping determining unit 218 determines to not apply frequency hopping to the user device. After determining to apply frequency hopping to one or more user devices $100_n$, the frequency hopping determining unit 218 reports to the scheduler 216 and the uplink-scheduling-grant-signal-transmission-control-signal generating unit 204 that frequency hopping is to be applied to the user devices $100_n$.

The scheduler 216 performs, for example, frequency scheduling based on the estimated uplink channel conditions of the user devices $100_n$ and QoS information of the user devices $100_n$ such as requested data rates, buffer statuses, desired error rates, and delays. Then, the scheduler 216 inputs allocated frequencies and bandwidths to the uplink-scheduling-grant-signal-transmission-control-signal generating unit 204 and the coherent detection unit 212, and inputs user numbers of selected user devices $100_n$ to the uplink-scheduling-grant-signal-transmission-control-signal generating unit 204 and the channel decoding unit 210. Here, "scheduling" indicates a process of selecting user devices allowed to transmit packet data using a shared channel in a given subframe. After user devices are selected in the scheduling, modulation schemes, coding rates, and data sizes of packet data to be transmitted by the selected user devices are determined. The modulation schemes, coding rates, and data sizes are determined, for example, based on SIRs of sounding reference signals (SRS) transmitted from the user devices via uplink. Also, resource units to be used by the selected user devices to transmit the packet data are determined. The resource units are determined, for example, based on SIRs of sounding reference signals (SRS) transmitted from the user devices via uplink.

The uplink-scheduling-grant-signal-transmission-control-signal generating unit 204 generates uplink scheduling grants based on the scheduling results, determined transport formats, and allocated frequency resources. Each uplink scheduling grant, for example, includes an ID of the selected user device allowed to communicate using the physical uplink shared channel, transport format information for the user data such as a data size and a modulation scheme, uplink resource unit allocation information, and transmission power information for the uplink shared channel. Here, uplink resource units correspond to frequency resources and may also be called resource blocks.

When user devices (hereafter may be called frequency-hopping-applied user devices) to which frequency hopping is to be applied are reported from the frequency hopping determining unit 218, the scheduler 216 allocates, to each of the frequency-hopping-applied user devices, resource units with different frequency bands in different slots of each subframe.

Also, the uplink-scheduling-grant-signal-transmission-control-signal generating unit 204 reports to the frequency-hopping-applied user devices that frequency hopping is to be applied. This "frequency hopping report" may be sent via the uplink scheduling grant or via an upper-layer control signal. The uplink scheduling grant is transmitted every subframe. Therefore, compared with a case using an upper-layer control signal, sending the frequency hopping report via the uplink scheduling grant makes it possible to more quickly switch between normal and frequency hopping allocation schemes.

When frequency hopping is to be applied to a user device, the uplink-scheduling-grant-signal-transmission-control-signal generating unit 204 generates, for each subframe, an uplink scheduling grant including information indicating first resource units (allocated in the first half (first slot) of the subframe) and the amount of shift in the frequency direction from the first resource units. For example, assuming that indexes are assigned to resource units from one end of the frequency direction, the uplink-scheduling-grant-signal-transmission-control-signal generating unit 204 generates, for each subframe, an uplink scheduling grant including indexes of first resource units and the amount of shift from the indexes of the first resource units. The user device $100_n$ determines second resource units allocated in the second half (second slot) of the subframe based on the amount of shift in the frequency direction from the first resource units.

The demodulation RS generating unit 206 generates a demodulation reference signal and inputs the generated demodulation reference signal to the synchronization-detection/channel-estimation unit 208.

The uplink-scheduling-grant-signal-transmission-control-signal generating unit 204 generates a control signal (uplink-scheduling-grant-signal transmission control signal) including the allocated frequencies and bandwidths and the user numbers of the selected user devices received from the scheduler 216, and inputs the control signal to the OFDM signal generating unit 202. The control signal may include the uplink scheduling grants.

The OFDM signal generating unit 204 generates an OFDM signal including the control signal and inputs the OFDM signal to a radio transmitter. As a result, the control signal is transmitted to the selected user devices via a downlink control channel.

The OFDM signal generating unit 202 may generate an OFDM signal that includes, in addition to the above described control channel, downlink channels such as a downlink reference signal, a data channel, and a paging channel, and input the OFDM signal to the radio transmitter. As a result, the downlink channels are transmitted to the users.

Next, the user device $100_n$ of this embodiment is described with reference to FIG. 6.

The user device $100_n$ of this embodiment includes an OFDM signal demodulation unit 102, an uplink-scheduling-grant-signal demodulation/decoding unit 104, an other-control-and-data-signals demodulation/decoding unit 106, a demodulation RS generating unit 108, a channel coding unit 110, a data modulation unit 112, and an SC-FDMA modulation unit 114. The OFDM signal demodulation unit 102, the uplink-scheduling-grant-signal demodulation/decoding unit 104, and the other-control-and-data-signals demodulation/decoding unit 106 constitute a receiving unit. The demodulation RS generating unit 108, the channel coding unit 110, the data modulation unit 112, and the SC-FDMA modulation unit 114 constitute a transmitting unit.

The user device $100_n$ decodes an uplink scheduling grant signal and if a user number corresponding to the user device $100_n$ is included in the uplink scheduling grant signal, generates and transmits a transmission signal.

A received signal from the base station $200_m$ is input to the OFDM signal demodulation unit 102. The OFDM signal demodulation unit 102 demodulates the received signal, inputs an uplink-scheduling-grant-signal transmission control signal in the received signal to the uplink-scheduling-grant-signal demodulation/decoding unit 104, and inputs control and data signals other than the uplink-scheduling-grant-signal transmission control signal in the received signal to the other-control-and-data-signals demodulation/decoding unit 106.

The uplink-scheduling-grant-signal demodulation/decoding unit 104 demodulates and decodes the uplink scheduling grant signal. If the uplink scheduling grant signal includes a "frequency hopping report" indicating that frequency hopping is applied to the user device $100_n$, the uplink-scheduling-grant-signal demodulation/decoding unit 104 inputs the frequency hopping report to the SC-FDMA modulation unit 114. The uplink-scheduling-grant-signal demodulation/decoding unit 104 also inputs information indicating allocated resource units to the SC-FDMA modulation unit 114. For example, the uplink-scheduling-grant-signal demodulation/decoding unit 104 inputs, to the SC-FDMA modulation unit 114, information indicating first resource units allocated in a first slot of each subframe and the amount of shift in the frequency direction from the first resource units.

The demodulation RS generating unit 108 generates a demodulation reference signal and inputs the generated demodulation reference signal to the SC-FDMA modulation unit 114.

Meanwhile, the channel coding unit 110 performs channel coding on user data, and the data modulation unit 112 performs data modulation on the channel-coded user data and inputs the data-modulated user data to the SC-FDMA modulation unit 114.

The SC-FDMA modulation unit (DFT-spread OFDM) 114 modulates the input demodulation reference signal and the user data based on the allocated resource units and outputs a transmission signal. For example, the SC-FDMA modulation unit (DFT-spread OFDM) 114 determines second resource units allocated in the second slot of a subframe based on the amount of shift in the frequency direction from the first resource units. This configuration makes it possible for a user device to which frequency hopping is applied to transmit data using resource units with different frequency bands in different slots of each subframe.

Next, a radio communication system including base stations and user devices according to another embodiment of the present invention is described.

The configurations of the radio communication system, the base stations, and the user devices of this embodiment are substantially the same as those described with reference to FIGS. 2, 5, and 6.

Figure 7:
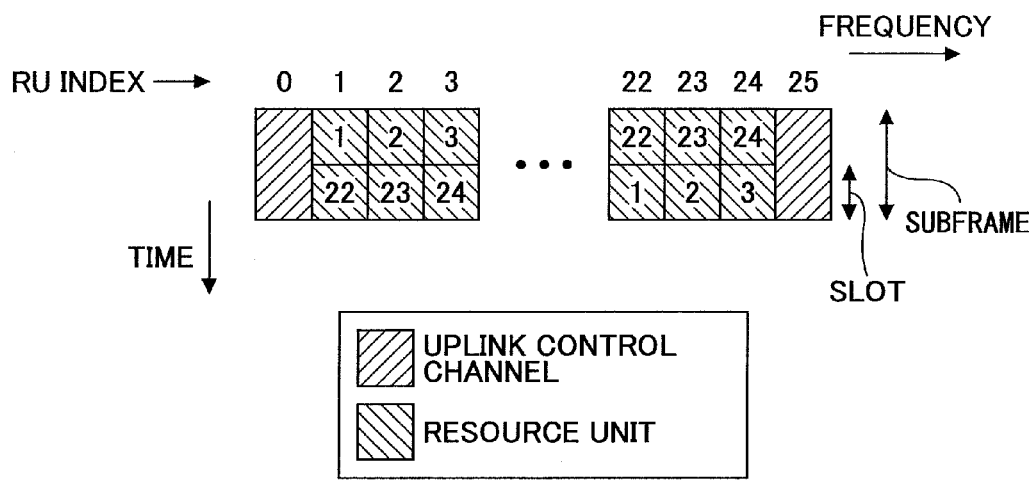
FIG. 7 is a drawing illustrating exemplary allocation of resource units to user devices to which frequency hopping is applied.

In this embodiment, similar to the above described embodiment, the base station 200 allocates, to a user device to which frequency hopping is to be applied, resource units with different frequency bands in different slots of each subframe. In this embodiment, the amount of shift in the frequency direction from first resource units allocated in the first half of each subframe is predetermined and used to determine second resource units allocated in the second half of the subframe. For example, assuming that indexes are assigned to resource units from one end of the frequency direction, the amount of shift is represented by a difference between the indexes (resource unit numbers) of first and second resource units. In the example shown in FIG. 7, the amount of shift is +21 and second resource units are identified by resource unit numbers obtained by adding 21 to each of the resource unit numbers of first resource units. The amount of shift may be defined in specifications according to a frequency band supported by user devices or may be reported via an upper layer signal. This configuration allows a user device to transmit a signal in a second slot of a subframe using a frequency band that differs by a given amount from the frequency band used in a first slot of the subframe, and thereby makes it possible to achieve a certain frequency diversity gain.

After scheduling, the base station 200 reports information indicating allocated resource units via an uplink scheduling grant to the user device. Because the amount of shift is predetermined or has been reported via an upper layer, the base station 200 reports, for each subframe, indexes of the first resource units.

When user devices to which frequency hopping is to be applied (frequency-hopping-applied user devices) are reported from the frequency hopping determining unit 218, the scheduler 216 allocates first resource units in the first half (first slot) of each subframe to the frequency-hopping-applied user devices. Here, since SC-FDMA is employed for uplink, when multiple resource units are to be allocated to a user device, it is necessary to allocate consecutive resource units in the first slot of each subframe so that resource units allocated in the second slot of the subframe do not become inconsecutive.

For a user device to which frequency hopping is to be applied, the uplink-scheduling-grant-signal-transmission-control-signal generating unit 204 generates, for each subframe, an uplink scheduling grant including information, such as indexes, indicating first resource units allocated in the first half of the subframe.

Next, a radio communication system including base stations and user devices according to another embodiment of the present invention is described.

The configurations of the radio communication system, the base stations, and the user devices of this embodiment are substantially the same as those described with reference to FIGS. 2, 5, and 6.

Figure 8:
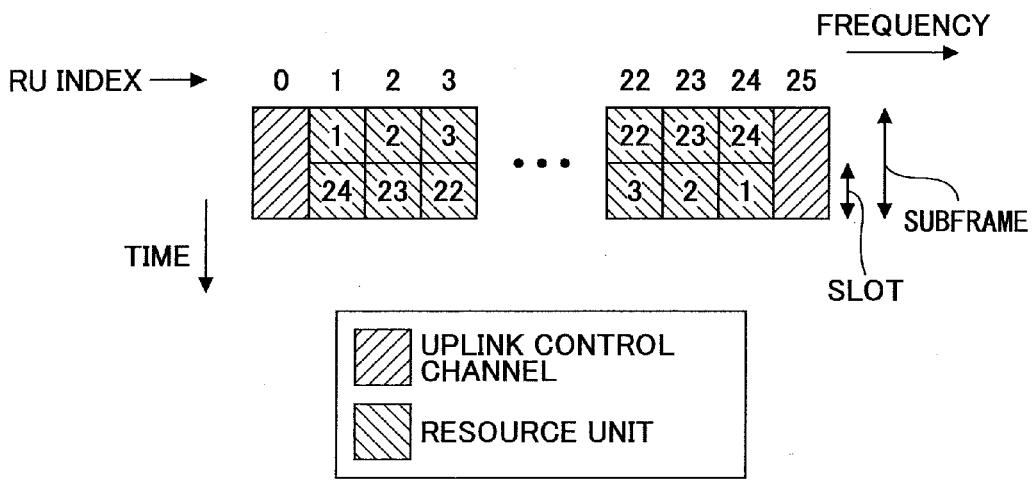
FIG. 8 is a drawing illustrating exemplary allocation of resource units to user devices to which frequency hopping is applied.

In this embodiment, similar to the above described embodiments, the base station 200 allocates, to a user device to which frequency hopping is to be applied, resource units with different frequency bands in different slots of each subframe. Also in this embodiment, the correspondence between first resource units allocated in the first half of a subframe and second resource units allocated in the second half of the subframe is predetermined. For example, assuming that indexes are assigned to resource units from one end of the frequency direction and an index of a first resource unit in the first half of a subframe is k (where k is an integer greater than or equal to 0), a corresponding second resource unit in the second half of the subframe is represented by "the highest resource unit index—k" as shown in FIG. 8. The correspondence may be defined in specifications or may be reported via an upper layer signal. This configuration prevents resource units allocated in a second slot from becoming inconsecutive and thereby makes it possible to achieve single-carrier transmission without performing any special control process.

After scheduling, information indicating allocated resource units is reported via an uplink scheduling grant. Because the correspondence between first resource units and second resource units is predetermined or has been reported via an upper layer, indexes of the first resource units is reported for each subframe via the uplink scheduling grant.

When user devices to which frequency hopping is to be applied (frequency-hopping-applied user devices) are reported from the frequency hopping determining unit 218, the scheduler 216 allocates first resource units in the first half (first slot) of each subframe to the frequency-hopping-applied user devices.

For a user device to which frequency hopping is to be applied, the uplink-scheduling-grant-signal-transmission-control-signal generating unit 204 generates, for each subframe, an uplink scheduling grant including information, such as indexes, indicating the first resource units.

Next, a radio communication system including base stations and user devices according to another embodiment of the present invention is described.

The configurations of the radio communication system, the base stations, and the user devices of this embodiment are substantially the same as those described with reference to FIGS. 2, 5, and 6.

In this embodiment, resource unit groups (RUG) each including multiple consecutive resource units are defined.

Figure 9:
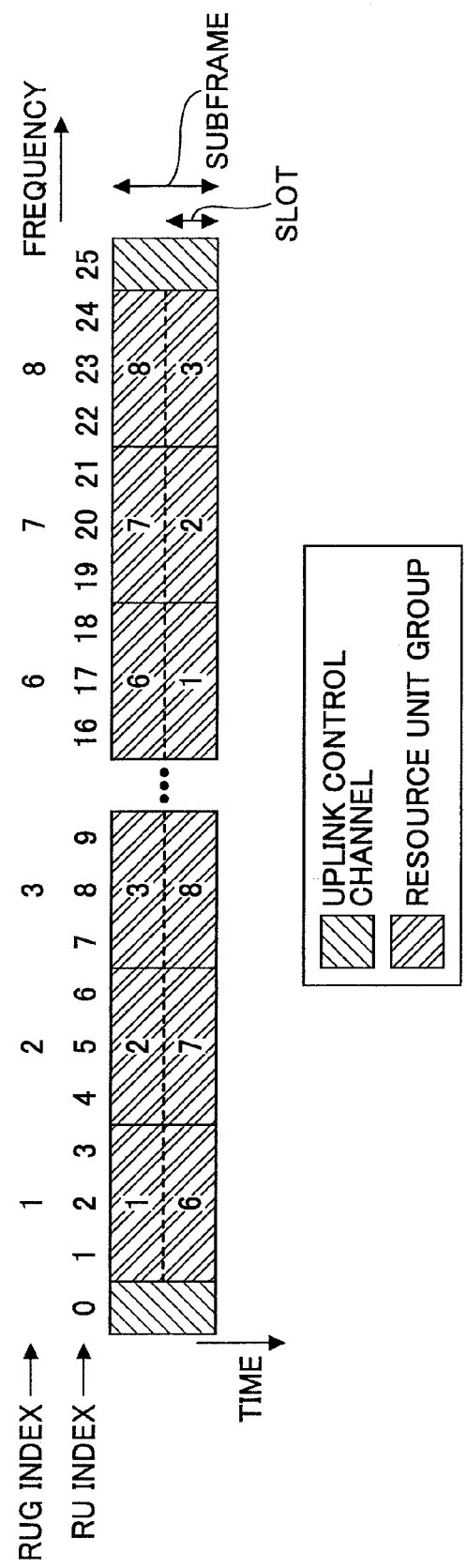
FIG. 9 is a drawing illustrating exemplary allocation of resource units to user devices to which frequency hopping is applied.

Similar to the above described embodiments, the base station 200 allocates, to a user device to which frequency hopping is to be applied, resource units with different frequency bands in different slots of each subframe. In this embodiment, the amount of shift in the frequency direction from a first resource unit group in the first half (first slot) of each subframe is predetermined and used to determine a second resource unit group in the second half (second slot) of the subframe. For example, assuming that indexes are assigned to resource unit groups from one end of the frequency direction, the amount of shift is represented by a difference between the indexes (resource unit group numbers) of first resource unit groups and second resource unit groups. In the example shown in FIG. 9, the amount of shift is +5 and a second resource unit group #6 in the second slot of a subframe is identified by adding 5 to a resource unit group number #1 of the corresponding first resource unit group in the first slot of the subframe.

Figure 10:
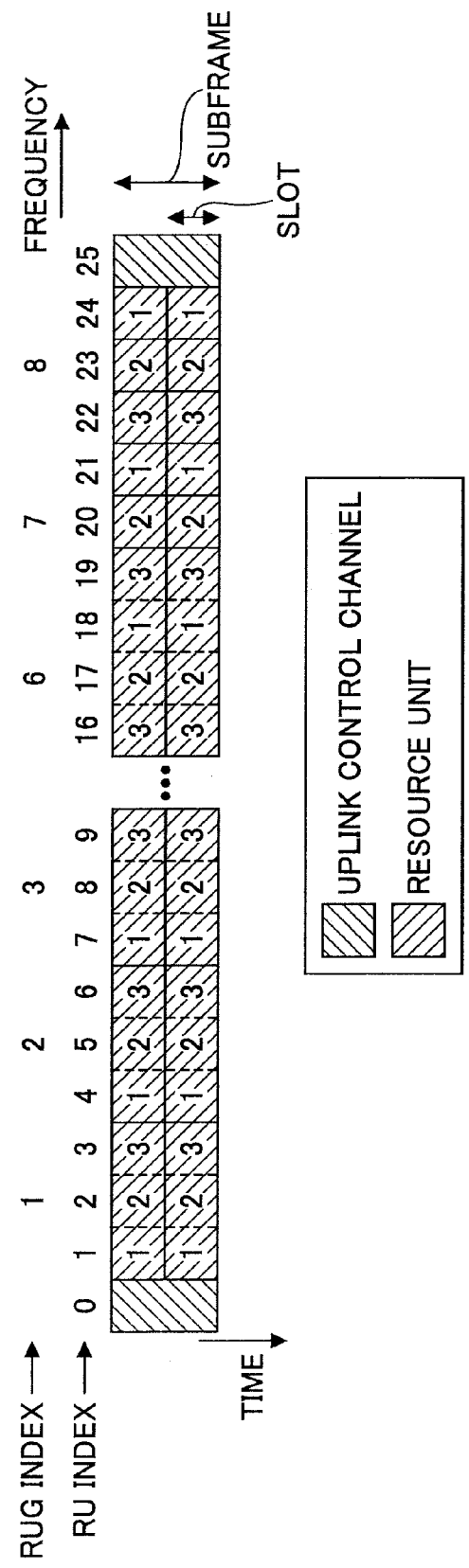
FIG. 10 is a drawing illustrating exemplary allocation of resource units to user devices to which frequency hopping is applied.

Also in this embodiment, the correspondence between resource units in a first resource unit group and a second resource unit group may be predetermined. Let us assume that indexes are assigned to resource units in each resource unit group from one end of the frequency direction as shown in FIG. 10. In this case, when an index of a resource unit in a first resource unit group is i (where i is an integer, and $0 < i \leq$ number of resource units in resource unit group), the corresponding resource unit in the second resource unit group is represented by "the highest resource unit index in the second resource unit group+1−i". The correspondence may be defined in specifications or may be reported via an upper layer signal. This configuration allows a user device to transmit a signal in a second slot of a subframe using a frequency band in a second resource unit group that differs by a given amount from the frequency band in a first resource unit group used in a first slot of the subframe, and thereby makes it possible to achieve a certain frequency diversity gain. This configuration also prevents resource units allocated in the second slot from becoming inconsecutive and thereby makes it possible to achieve single-carrier transmission without performing any special control process.

After scheduling, information, such as indexes, indicating allocated resource units is reported via an uplink scheduling grant. Because the correspondence between first and second resource unit groups and the correspondence between resource units in the first and second resource unit groups are predetermined or have been reported via an upper layer, information indicating the first resource unit group and information indicating resource units in the first resource unit group are reported via the uplink scheduling grant. More particularly, an index of the first resource unit group and indexes of resource units in the first resource unit group are reported via the uplink scheduling grant.

When user devices to which frequency hopping is to be applied (frequency-hopping-applied user devices) are reported from the frequency hopping determining unit 218, the scheduler 216 allocates first resource units in the first half (first slot) of each subframe to the frequency-hopping-applied user devices.

For each of the frequency-hopping-applied user devices, the uplink-scheduling-grant-signal-transmission-control-signal generating unit 204 generates, for each subframe, an uplink scheduling grant including an index of a first resource unit group allocated in the first half of the subframe and indexes of resource units in the first resource unit group.

Next, a radio communication system including base stations and user devices according to another embodiment of the present invention is described.

The configuration of the radio communication system of this embodiment is substantially the same as that described with reference to FIG. 2.

Figure 5:
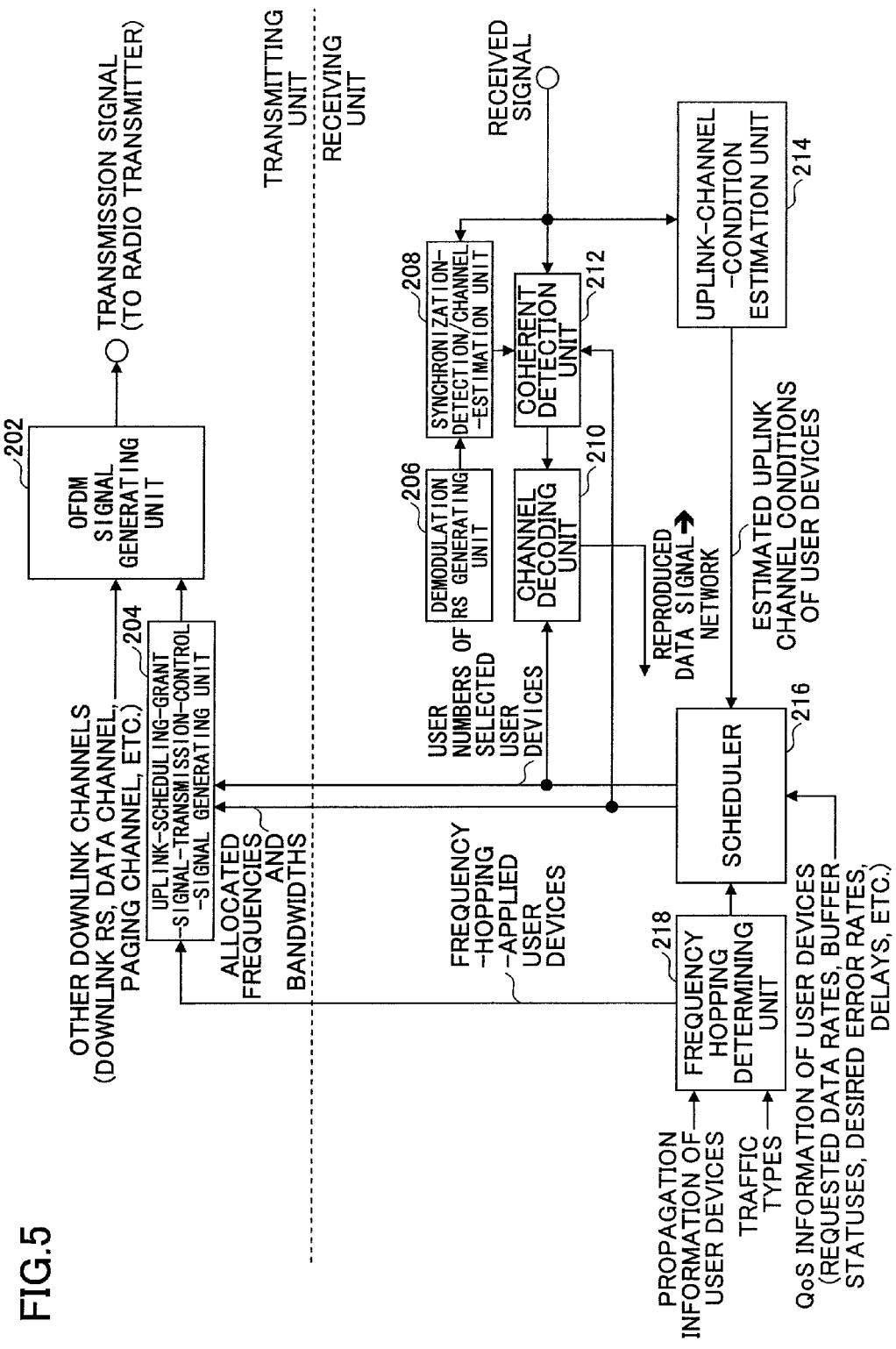
FIG. 5 is a partial block diagram of a base station according to an embodiment of the present invention.
Figure 11:
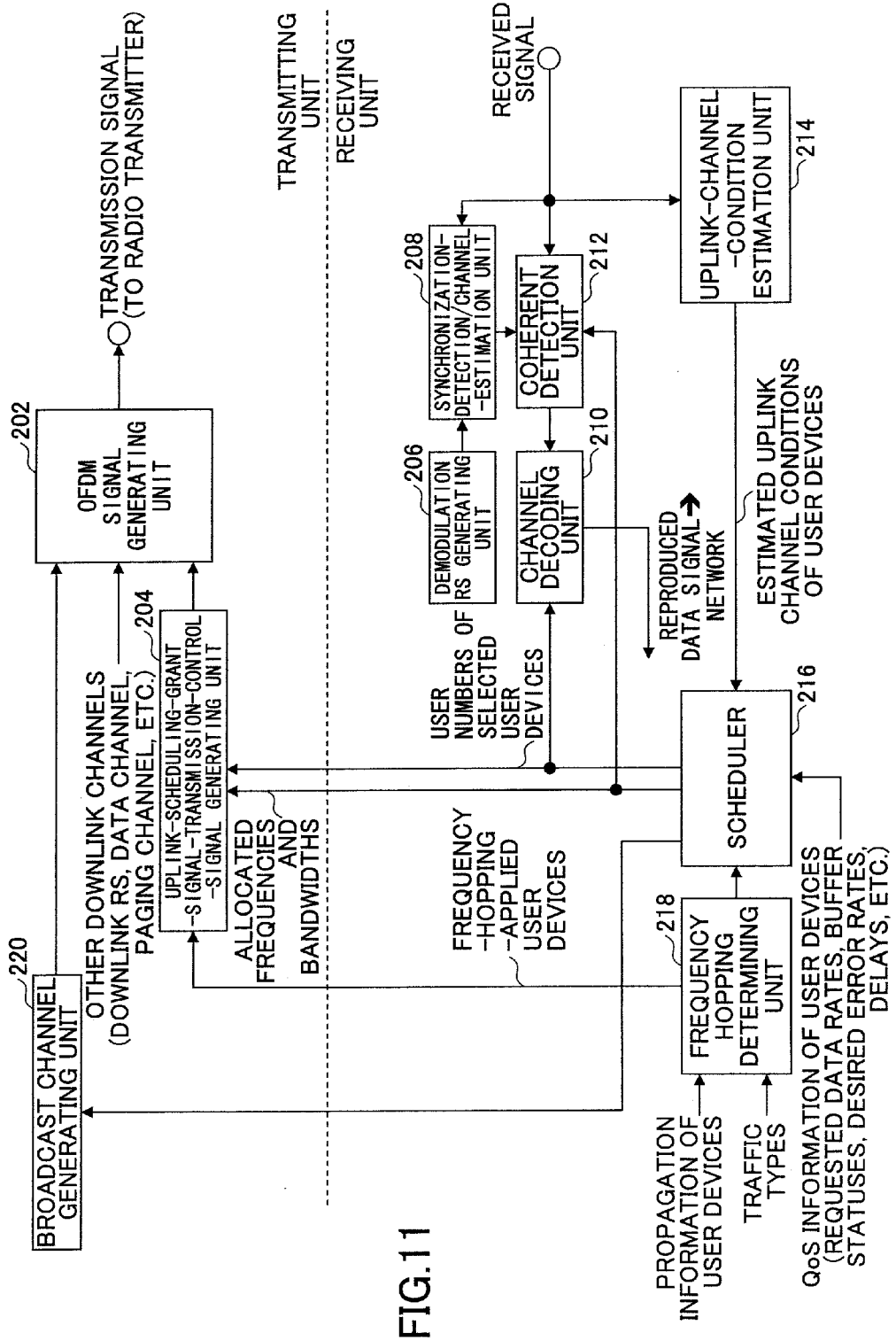
FIG. 11 is a partial block diagram of a base station according to an embodiment of the present invention.

A base station 200 of this embodiment has a configuration as shown in FIG. 11 where a broadcast channel generating unit 220 connected to the scheduler 216 and the OFDM signal generating unit 202 is added to the configuration shown in FIG. 5.

In this embodiment, the scheduler 216 inputs allocation information indicating resource units allocated in the scheduling to the broadcast channel generating unit 220.

The broadcast channel generating unit 220 transmits a broadcast channel including the allocation information via a physical downlink shared channel. The broadcast channel transmitted via the physical downlink shared channel is also called a dynamic broadcast channel.

This configuration makes it possible to report to a user device that frequency hopping is to be applied to the user device by using only one bit. In this case, the uplink scheduling grant includes one bit of information indicating whether frequency hopping is to be applied.

Figure 6:
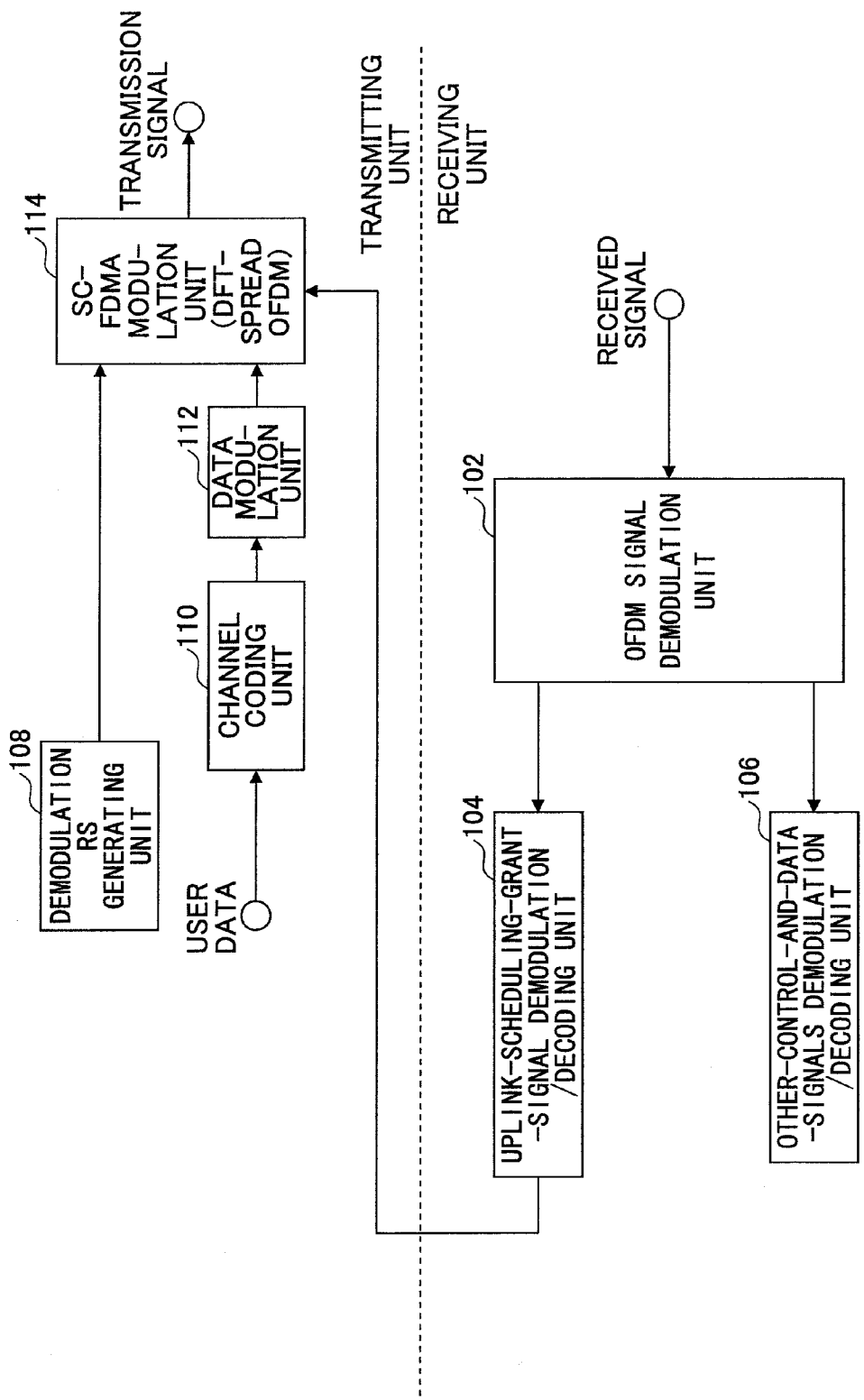
FIG. 6 is a partial block diagram of a user device according to an embodiment of the present invention.
Figure 12:
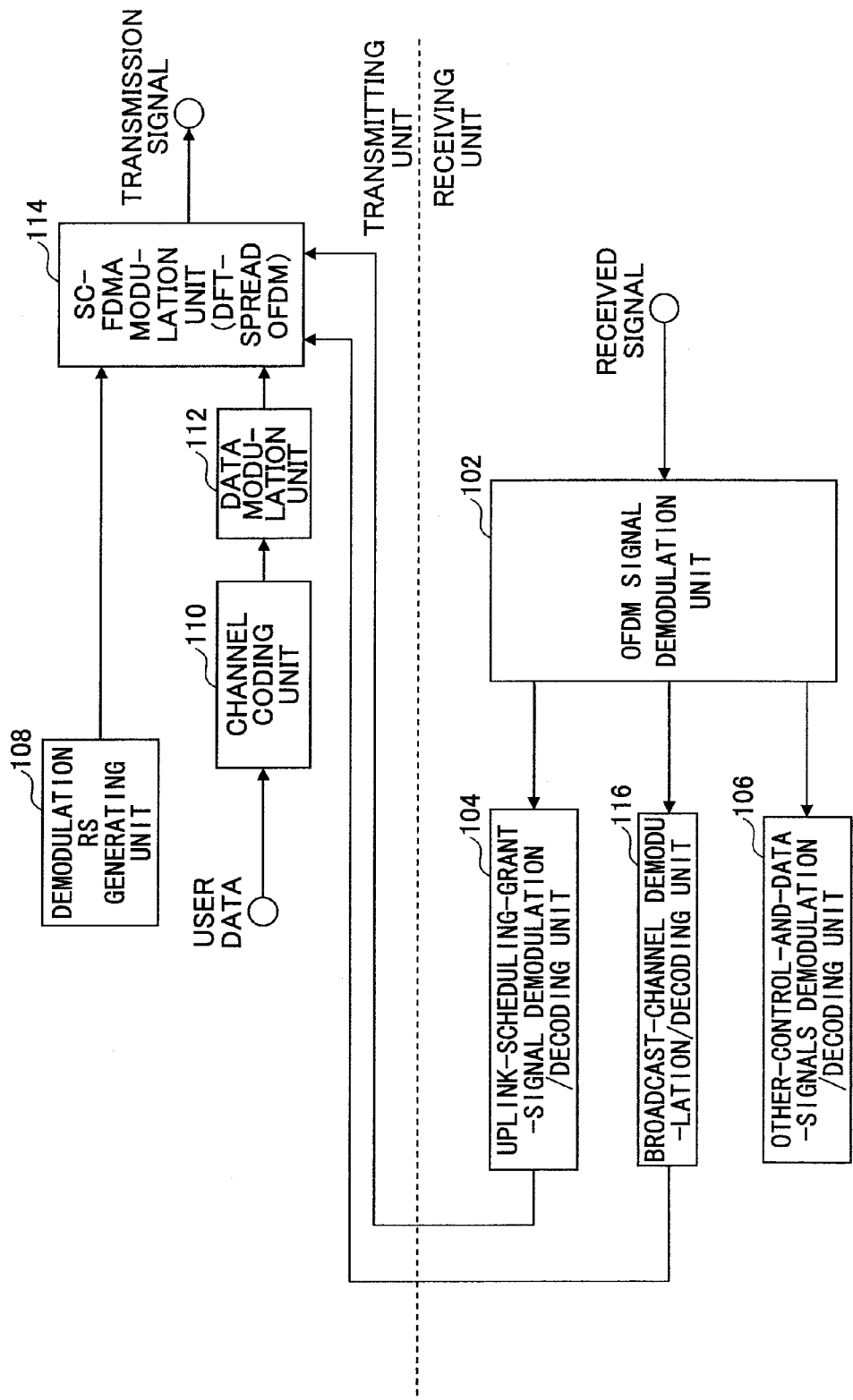
FIG. 12 is a partial block diagram of a user device according to an embodiment of the present invention.

A user device 100 of this embodiment has a configuration as shown in FIG. 12 where a broadcast-channel demodulation/decoding unit 116 connected to the OFDM signal demodulation unit 102 and the SC-FDMA modulation unit 114 is added to the configuration shown in FIG. 6.

A received signal from the base station $200_m$ is input to the OFDM signal demodulation unit 102. The OFDM signal demodulation unit 102 demodulates the received signal, inputs an uplink-scheduling-grant-signal transmission control signal in the received signal to the uplink-scheduling-grant-signal demodulation/decoding unit 104, inputs a broadcast channel in the received signal to the broadcast-channel demodulation/decoding unit 116, and inputs control and data signals other than the uplink-scheduling-grant-signal transmission control signal and the broadcast channel in the received signal to the other-control-and-data-signals demodulation/decoding unit 106.

The broadcast-channel demodulation/decoding unit 116 demodulates and decodes the input broadcast channel and inputs allocation information of resource units to the SC-FDMA modulation unit 114.

In the above described embodiments, as shown in FIG. 13, frequency bands located near the lower and higher ends of a system frequency band are allocated to user devices to which frequency hopping is applied, and other frequency bands are allocated to user devices to which localized FDMA is applied. In this embodiment, as shown in FIG. 14, frequency bands other than the frequency bands located near the lower and higher ends of a system frequency band may also be allocated to user devices to which frequency hopping is applied. With this configuration, it is possible to efficiently perform frequency scheduling even when frequency hopping is applied to a large number of user devices.

In the above embodiments, it is assumed that a system based on Evolved UTRA and UTRAN (also called Long Term Evolution or Super 3G) is used. However, a base station according to an embodiment of the present invention may also be applied to any system employing an FDMA scheme, such as SC-FDMA, for uplink.

Although specific values are used in the above descriptions to facilitate the understanding of the present invention, the values are just examples and different values may also be used unless otherwise mentioned.

The present invention is not limited to the specifically disclosed embodiments, and variations and modifications may be made without departing from the scope of the present invention. Although functional block diagrams are used to describe apparatuses in the above embodiments, the apparatuses may be implemented by hardware, software, or a combination of them.

The present international application claims priority from Japanese Patent Application No. 2007-211598 filed on Aug. 14, 2007, the entire contents of which are hereby incorporated herein by reference.

The invention claimed is:

1. A user device, comprising:
a modulation unit adapted for a system where
multiple resource units are defined in a system frequency band in a frequency domain,
a subframe includes a first slot and a second slot in a time domain, and
each of the resource units has a length of one slot in the time domain, the modulation unit being configured to map data of the user device to resource units with different frequency bands in the first slot and the second slot; and
a transmission unit configured to transmit the mapped data, wherein
two or more resource unit groups each including two or more resource units that are consecutive in the frequency domain are defined in the system frequency band for each of the first slot and the second slot,
the modulation unit is configured to map the data to a first resource unit in a first resource unit group in the first slot and to a second resource unit in a second resource unit group in the second slot such that the first resource unit group is apart from the second resource unit group by a bandwidth corresponding to a predetermined number of the resource unit groups,
indexes are assigned to the resource units in each of the resource unit groups, the indexes gradually increasing from 1 in a direction from a low frequency side to a high frequency side, and
the second resource unit in the second resource unit group to which the data are mapped in the second slot is represented by a formula: (a highest index of the resource units in the second resource unit group)+1−(an index of the first resource unit in the first resource unit group to which the data are mapped in the first slot).

2. The user device as claimed in claim 1, further comprising:
a receiving unit configured to receive, from a base station, information indicating the index of the first resource unit in the first resource unit group, wherein the modulation unit is configured to map the data based on the information received by the receiving unit.

3. The user device as claimed in claim 1, further comprising:
a receiving unit configured to receive, from a base station, information indicating that the data of the user device need to be mapped to the resource units with different frequency bands in the first slot and the second slot.

4. A method performed by a user device for a system where multiple resource units are defined in a system frequency band in a frequency domain, a subframe includes a first slot and a second slot in a time domain, and each of the resource units has a length of one slot in the time domain, the method comprising:
mapping data of the user device to resource units with different frequency bands in the first slot and the second slot; and
transmitting the mapped data, wherein two or more resource unit groups each including two or more resource units that are consecutive in the frequency domain are defined in the system frequency band for each of the first slot and the second slot,
the data are mapped to a first resource unit in a first resource unit group in the first slot and to a second resource unit in a second resource unit group in the second slot such that the first resource unit group is apart from the second resource unit soup by a bandwidth corresponding to a predetermined number of the resource unit groups,
indexes are assigned to the resource units in each of the resource unit groups, the indexes gradually increasing from 1 in a direction from a low frequency side to a high frequency side, and
the second resource unit in the second resource unit group to which the data are mapped in the second slot is represented by a formula: (a highest index of the resource units in the second resource unit group)+1−(an index of the first resource unit in the first resource unit group to which the data are mapped in the first slot).

5. A communication system, comprising:
a user device and a base station,
wherein the user device includes
a modulation unit adapted for a system wherein:
multiple resource units are defined in a system frequency band in a frequency domain, a subframe includes a first slot and a second slot in a time domain, and each of the resource units has a length of one slot in the time domain, the modulation unit being configured to map data of the user device to resource units with different frequency bands in the first slot and the second slot, and a transmission unit configured to transmit the mapped data to the base station, two or more resource unit groups each including two or more resource units that are consecutive in the frequency domain are defined in the system frequency band for each of the first slot and the second slot, the modulation unit is configured to map the data to a first resource unit in a first resource unit group in the first slot and to a second resource unit in a second resource unit group in the second slot such that the first resource unit group is apart from the second resource unit group by a bandwidth corresponding to a predetermined number of the resource unit groups, indexes are assigned to the resource units in each of the resource unit groups, the indexes gradually increasing from 1 in a direction from a low frequency side to a high frequency side, and the second resource unit in the second resource unit group to which the data are mapped in the second slot is represented by a formula: (a highest index of the resource units in the second resource unit group)+1−(an index of the first resource unit in the first resource unit group to which the data are mapped in the first slot).

* * * * *